United States Patent
Norsic et al.

(10) Patent No.: US 10,351,638 B2
(45) Date of Patent: Jul. 16, 2019

(54) IRON-BASED PRECATALYST AND ITS USE IN THE POLYMERIZATION OF α-OLEFINS

(71) Applicants: CENTRE NATIONAL DE LA RECHERCHE SCIENTIFIQUE, Paris (FR); UNIVERSITE CLAUDE BERNARD LYON 1, Villeurbanne (FR); CPE LYON FORMATION CONTINUE ET RECHERCHE—CPE LYON FCR, Villeurbanne (FR)

(72) Inventors: Sébastien Norsic, Lyons (FR); Vincent Monteil, Lyons (FR); Jean Raynaud, Villeurbanne (FR)

(73) Assignees: CENTRE NATIONAL DE LA RECHERCHE SCIENTIFIQUE, Paris (FR); UNIVERSITE CLAUDE BERNARD LYON 1, Villeurbanne (FR); CPE LYON FORMATION CONTINUE ET RECHERCHE—CPE LYON FCR, Villeurbanne (FR)

( * ) Notice: Subject to any disclaimer, the term of this patent is extended or adjusted under 35 U.S.C. 154(b) by 2 days.

(21) Appl. No.: 15/555,991

(22) PCT Filed: Mar. 9, 2016

(86) PCT No.: PCT/EP2016/055056
§ 371 (c)(1),
(2) Date: Sep. 6, 2017

(87) PCT Pub. No.: WO2016/142436
PCT Pub. Date: Sep. 15, 2016

(65) Prior Publication Data
US 2018/0037678 A1    Feb. 8, 2018

(30) Foreign Application Priority Data
Mar. 9, 2015 (FR) .................... 15 51954

(51) Int. Cl.
*C08F 4/70* (2006.01)
*C08F 4/80* (2006.01)
*C08F 218/04* (2006.01)
*C08F 220/00* (2006.01)
*C08F 110/02* (2006.01)

(52) U.S. Cl.
CPC .............. *C08F 4/80* (2013.01); *C08F 4/70* (2013.01); *C08F 110/02* (2013.01); *C08F 218/04* (2013.01); *C08F 220/00* (2013.01)

(58) Field of Classification Search
CPC .. C08F 4/70; C08F 4/80; C08F 110/02; C08F 110/06; C08F 110/16; C08F 10/00; C08F 216/00
See application file for complete search history.

(56) References Cited

U.S. PATENT DOCUMENTS

| | | | |
|---|---|---|---|
| 4,245,071 A | 1/1981 | Kondo et al. | |
| 6,221,801 B1 | 4/2001 | Brusson et al. | |
| 9,815,918 B2 * | 11/2017 | Xu | ........................ C08F 110/06 |

FOREIGN PATENT DOCUMENTS

| | | |
|---|---|---|
| EP | 0 717 052 | 6/1996 |
| GB | 1 576 431 | 10/1980 |

OTHER PUBLICATIONS

Written Opinion in International Application No. PCT/EP2016/055056, dated May 24, 2016, pp. 1-5.

* cited by examiner

*Primary Examiner* — Caixia Lu
(74) *Attorney, Agent, or Firm* — Saliwanchik, Lloyd & Eisenschenk

(57) ABSTRACT

A precatalyst for the polymerization of α-olefins, having the formula $Fe_uM^{alc}_vX_w(LA)_y(LB)_z$ wherein:
$M^{alc}$ is an alkali metal and/or an alkaline-earth metal;
X is an anion;
LA is a Lewis acid;
LB is a Lewis base;
u is from 0.001 to 10;
v is an integer ≥1;
w is from 1 to 20;
y is from 0 to 10;
z is from 0 to 10.

15 Claims, No Drawings

IRON-BASED PRECATALYST AND ITS USE IN THE POLYMERIZATION OF α-OLEFINS

CROSS-REFERENCE TO RELATED APPLICATION

This application is the U.S. national stage application of International Patent Application No. PCT/EP2016/055056, filed Mar. 9, 2016.

FIELD OF THE INVENTION

The present invention relates to an iron-based precatalyst, the method of obtaining it, and its use in the polymerization or copolymerization of α-olefins (primarily ethylene and propene) and other vinyl monomers (i.e. α-olefins, 1,3-dienes, polar vinyl monomers such as (meth)acrylates, (meth)acrylamides, (meth)acrylonitriles, vinyl esters, vinyl ethers, vinyl halides, styrenics . . . ).

STATE OF THE ART

Polymerization of α-olefins (i.e. ethylene and α-olefins) to obtain HDPE and LLDPE (high density polyethylene and linear low density polyethylene) is typically carried out in a homogeneous or heterogeneous environment, in the presence of one of the following catalysts:
- A Ziegler-Natta multi-site catalyst system, especially with a group IV metal such as titanium;
- A chromium-based Phillips type multi-site catalytic system; or
- A metallocene mono-site catalytic system, especially with a group IV metal such as titanium or zirconium.

Multi-site catalytic systems like Ziegler-Natta and Phillips can produce polyolefins with relatively large size distribution (dispersity) present in high molar masses, giving the polymers very high mechanical properties (high molar masses) that shape with relative ease. Ziegler-Natta catalysis is therefore a method of choice for synthesizing HDPE and LLDPE polyolefins. Further, the Ziegler-Natta and Phillips catalytic systems are solid systems perfectly suited for existing industrial processes (Gas Phase, Dispersion ("Slurry") etc.)

The metallocene mono-site catalytic systems can produce controlled-architecture polyolefins with a narrow molar mass distribution and with potentially very linear chains that have a strong tendency to crystallize. However, these systems are relatively onerous and complicated to prepare. For iron, some homogeneous systems have been reported (Brookhart and Gibson catalysts have bisiminopyridine ligands). This allows for synthesis of high molar mass and dispersion polyethylene, but does not allow for copolymerization of ethylene and α-olefins that is essential in synthesizing LLDPE, which prevents their industrial development.

New iron-based systems have been developed. They have the advantages of the Ziegler-Natta and Phillips prior art and additionally make it possible to produce polymers with relatively narrow molar mass distributions. Further, they are based on an abundant, economical and non-toxic metal: iron.

While some of these systems are relatively satisfactory in terms of the polyolefin properties obtained, there is still a demand to decrease the cost of catalysts and improve their preparation, stability and ease of use while at the same time controlling the molar mass of polyolefins obtained, in particular, the dispersity of molar mass distribution (breadth of molar mass distribution).

Nevertheless, prior art heterogeneous systems do not allow the copolymerization of polar α-olefins. Such copolymerization has mainly been reported for homogeneous palladium catalysts, which is not viable on a large industrial scale (Bas de Bruin et al. Chem. Soc. Rev. 2013, 42, 5809-5832; Nozaki et al. Acc. Chem. Res 2013, 46, 1438-1449).

The Applicant has developed a new technology with the same advantages as the multi-site catalytic systems like Ziegler-Natta and Phillips but substituting the Ti and Cr metals, respectively, with an abundant, economical and non-toxic metal: iron.

In addition, the present iron-centered technology also allows copolymerization of ethylene and α-olefins, as required by mono-site catalytic systems. This technology also allows the copolymerization of polar α-olefins. It allows the control of the molecular mass of the polyolefin, as well as the linearity of the polymer chains.

DESCRIPTION OF THE INVENTION

The present invention makes it possible to synthesize polymers and copolymers from monomers such as ethylene ($CH_2=CH_2$) or propene ($CH_2=CH-CH_3$), α-olefins (polar and non-polar), and 1,3-dienes because of the heterogeneous iron-based catalytic system.

The catalytic system according to the invention is relatively simple to prepare because it uses inorganic ligands that do not require multi-step organic synthesis. Secondly, the polymers obtained possess a relatively controlled architecture and high molar masses that confer excellent mechanical properties to the final materials, as has already been mentioned.

The present invention is an alternative to the Ziegler-Natta type catalysts that use such group IV metals as titanium, and Phillips type catalysts based upon chromium in ethylene polymerization and copolymerization processes with other vinyl monomers (i.e. α-olefins, 1,3-dienes). This invention is based on the use of iron instead of such metals as titanium, zirconium or chromium.

The Applicant has developed an iron-based precatalyst with cost, durability, toxicity and simplicity of use that potentially rival the Ziegler-Natta heterogeneous systems of the prior art. Use of an iron-based compound has the added advantage of compliance with a policy of sustainable development.

In addition to these aspects, its various degrees of oxidation make iron particularly attractive because of its potential for compatibility with the multiple intermediaries generally necessary to the catalytic cycles.

This precatalyst is obtained from an iron precursor, a Lewis acid, and an inorganic support.

More precisely, the present invention relates to a precatalyst for the polymerization of α-olefins, with the formula $Fe_u M^{alc}{}_v A(LA)_y (LB)_z$ wherein:
- $M^{alc}$ is an alkali metal and/or an alkaline-earth metal, preferentially alkaline-earth;
- X is an anion, preferentially a halogen anion (even more preferentially $Cl^-$) or a mixture of different halogenated and/or non-halogenated anions ($SO_4^{2-}$ or $PO_4^{3-}$ for example);
- LA is a Lewis acid;
- LB is a Lewis base;
- u ranges from 0.001 to 10, advantageously from 0.01 to 0.5;
- v is an integer ≥1;
- w ranges from 1 to 20, advantageously from 1.01 to 3;
- y ranges from 0 to 10, advantageously from 0.1 to 1;
- z ranges from 0 to 10, advantageously from 0.05 to 0.5.

According to a preferred embodiment, y is greater than 0. According to another preferred embodiment, z is greater than 0. According to another preferred embodiment, y and z are greater than 0.

In the precatalyst according to the invention, $M^{alc}$ combined with type X anions constitutes the inorganic support of the solid precatalyst.

Said precatalyst includes iron combined with an inorganic support (based of $M^{alc}$ and X). It enables a catalyst to form for the polymerization and copolymerization of α-olefins and other vinyl monomers. The precatalyst forms a more stable species than the active species permitting polymerization reactions.

Lewis acid (LA) denotes a molecule with one atom that can accept an electron pair. Said atom comes from the main group of the periodic table, particularly boron or aluminum Advantageously, the Lewis acid (LA) may be selected from the group comprising $SiCl_4$; $BCl_3$; $AlCl_3$; $SnCl_4$; $BiCl_3$; $ZnCl_2$; $CaCl_2$; LiCl; KCl; NaCl; and combinations thereof.

Lewis base (LB) denotes a molecule with one atom that can yield an electron pair. Said atom advantageously comes from the main group in the periodic table, notably oxygen, nitrogen or phosphorus.

To be most advantageous, the Lewis Acid (LB) may be selected from the group comprising alcohols, ethers (for instance diethylether, tetrahydrofuran), diesters, amines, phosphines, and their combinations.

From the processing perspective, the Lewis base (LB) can be introduced with the inorganic support (if it was previously combined with the LB). For example, $MgCl_2(THF)_p$ or $MgCl_2(EtOH)_t$ [0≤(p; t)≤3] can be prepared by dispersing the inorganic solid in THF (tetrahydrofuran) or ethanol at reflux, and are good examples of effective supports for Ziegler-Natta catalysis in general.

The Lewis base (LB) can also be introduced when the precatalyst is being synthesized during impregnation of the iron salts in the presence of all of the components. For example, THF can be used as a reaction solvent during this step (iron salts are often soluble in THF) After the precatalyst is obtained, residual THF molecules will then be considered as Lewis base (LB) molecules.

The present invention also relates to the method of preparation of the precatalyst of formula $Fe_u M^{alc}_v X_w (LA)_y (LB)_z$, wherein:
  a suspension, preferably a colloidal suspension, containing the following is prepared:
    at least one organic solvent;
    at least one iron salt;
    at least one inorganic support;
    optionally, at least one Lewis base LB;
    optionally, at least one Lewis acid LA;
  this suspension is mixed at a temperature advantageously comprised between 10 and 200° C.;
  the solvent is removed;
  a precatalyst with formula $Fe_u M^{alc}_v X_w (LA)_y (LB)_z$ is obtained.

The synthesis of $Fe_u M^{alc}_v X_w (LA)_y (LB)_z$ is preferably carried out in the absence of water.

According to one particular embodiment, the suspension (preferably a colloidal suspension) also contains a Lewis acid and/or a Lewis base. Advantageously, it contains at least one Lewis acid.

Advantageously, with the exception of the solvent, this suspension advantageously includes:

0.001 to 50 mol % of iron salt, advantageously 0.01 to 1 mol %;
10 to 99.999 mol % inorganic support, more advantageously 50 to 95 mol %;
0 to 50 mol % of Lewis acid, more advantageously 0.1 to 10 mol %.

The organic solvent used to prepare the precatalyst is advantageously a chlorinated or oxygenated solvent.

According to one particular embodiment, the organic solvent can be a Lewis base.

The organic solvent can in particular be selected from the group comprising dichloromethane; chlorobenzene; dichloroethane; dichlorobenzene; trichlorobenzene; tetrahydrofuran; methyltetrahydrofuran; dioxane; and their combinations.

It is advantageously dichloromethane or tetrahydrofuran.

The iron salt is generally a compound in which iron advantageously has oxidation state +II or +III. This could in particular be a halogenated iron (II) or (III) salt.

It is advantageously selected from the group of iron (II) salts comprising $FeCl_2$; $FeBr_2$; $FeI_2$; FeO; $Fe(SO_4)$; and their combinations.

The iron salt may or may not be hydrated. However, the non-hydrated form is preferred.

The iron salt is advantageously a solid compound at room temperature. That makes it easier to use than the titanium precursor ($TiCl_4$) conventionally used in the Ziegler-Natta processes. In fact, $TiCl_4$ is a liquid at room temperature. In addition, iron salts generally reveal greater stability under normal industrial storage conditions. $TiCl_4$ can hydrolyze during storage and release hydrochloric acid, which could have harmful safety repercussions.

The inorganic support is advantageously an alkali or alkaline-earth [metal] salt, or a magnesium salt for example.

It may in particular have the formula $M^{alc}X_n$ or $M^{alc}O_{n/2}$ in which $M^{alc}$ is an alkali metal or an alkaline-earth metal; n=1 or 2; and X is an anion. X is preferably a halogen, for example $Cl^-$; a sulfate such as $SO_4^{2-}$; or a phosphate such as $PO_4^{3-}$.

It can be selected from a group comprising $MgCl_2$; $CaCl_2$; LiCl; NaCl; KCl; and their combinations.

Advantageously, the inorganic support is $MgCl_2$ or $CaCl_2$.

The inorganic support is advantageously insoluble in the organic solvent used. On the other hand, it is advantageous that the iron salt, and particularly the Lewis acid and the Lewis base, are soluble in the organic solvent.

According to a particular embodiment, the inorganic support based on $M^{alc}$ and X can contain the Lewis base LB, particularly when it was combined with the Lewis base LB prior to being added to the organic solvent.

In the scope of the present invention, a compound is soluble when at least 0.1 g of compound can be dissolved in 100 mL of organic solvent.

The precatalyst is advantageously prepared using mechanical stirring. Those conditions can in particular facilitate impregnation of the iron and, if need be, the Lewis acid and the Lewis base on the inorganic support.

In addition, the precatalyst is advantageously prepared at reflux in the organic solvent.

As already indicated, the precatalyst is prepared at a temperature advantageously comprised between 10 and 200° C. Advantageously the temperature is comprised between 20 and 90° C.

Thus, according to one particular embodiment of the invention, the organic solvent can be maintained with mechanical agitation and potentially under reflux for a duration comprised between 1 to 240 hours, preferably between 24 and 120 hours.

At the beginning of this step, the solvent is removed. The precatalyst can in particular be separated from the organic solvent by filtration or by evaporating the organic solvent.

The precatalyst is then advantageously washed, for example with a nonpolar solvent, notably an alkane solvent, before drying, for example in a vacuum.

The iron-based precatalyst is advantageously presented in solid form, particularly in powder form.

The present invention also relates to the use of this iron-based precatalyst in an ethylene polymerization process or an ethylene copolymerization process with at least one α-olefin (polar or non-polar) or one 1,3-diene. It also relates to the polymerization and copolymerization of propene with ethylene, an α-olefin (polar or non-polar) or one 1,3-diene.

The α-olefin is preferably of formula $CH_2=CHR^1$; in which $R^1$ is selected from the group comprising: hydrogen (ethylene); saturated hydrocarbon groups, for instance $CH_3$ (propene) or $(CH_2)_3CH_3$ (1-hexene); hydrocarbon groups having at least one C=C double bond which may be (or not) conjugated with the vinyl group of the α-olefin, for instance $CH=CH_2$ (1,3-diene such as butadiene); and aromatic hydrocarbon groups, for instance $C_6H_5$ (styrene).

The α-olefin of formula $CH_2=CHR^1$ can therefore be selected from the group comprising: dienes; conjugated dienes such as butadiene or isoprene; styrene; α-olefins having $R^1=C_nH_{2n-1}$, wherein n is an integer ranging from 1 to 100, preferably between 1 and 10; and mixtures thereof.

The α-olefin may also be a polar α-olefin.

Polar monomers include the following monomers of formula $CH_2=CR^2R^3$ with $R^2$=H or $CH_3$ and $R^3$ is any of the following:
 C(=O)—O-alkyl ((meth)acrylates) such as ethyl acrylate and butyl acrylate;
 O—(C=O)-alkyl (vinyl esters such as vinyl acetate);
 CN ((meth)acrylonitriles);
 C(=O)—N-(alkyl)$_2$ ((meth)acrylamides);
 O-alkyl (vinyl ethers);
 halide (F, Cl . . . i.e. vinyl halides);
wherein the alkyl group is a linear or branched $C_nH_{2n-1}$ group in which n is an integer ranging from 1 to 100, preferably between 1 and 10.

Polar monomers also include monomers of formula $CH_2=CR^2R^3$ with $R^2=R^3$=halide, for instance F or Cl.

The term "(meth)acrylates" refers to acrylates and methacrylates monomers. The same nomenclature is used for the acrylonitriles and acrylamides monomers.

The polar monomer may also comprise halogen atom(s). It can therefore be a chlorinated or fluorinated monomer.

Accordingly, in a non-limitative way, the invention allows the preparation of any of the following copolymers:
 ethylene/propene;
 ethylene/propene/diene (unconjugated);
 ethylene/styrene;
 ethylene/α-olefin;
 ethylene/polar monomer;
 propene/polar monomer;
 α-olefin/polar monomer;
 diene/polar monomer;
 styrene/polar monomer;
 ethylene/styrene/polar monomer;
 α-olefin/diene/polar monomer;
 ethylene/propene/polar monomer.

The precatalyst according to the invention is used, in general, in the polymerization or copolymerization of ethylene or propene and other vinyl monomers (i.e. α-olefins, 1,3-dienes) in heterogeneous processes (Gas Phase, Dispersion ("Slurry") etc.) where the catalytic system is not soluble in the polymerization medium.

The process for the polymerization of ethylene or propene comprises the following steps:
 activating the precatalyst according to the invention by dissolving the precatalyst in a reactor in the presence of at least one hydrocarbon solvent, at least one alkylating agent, and optionally hydrogen;
 adding ethylene or propene into the reactor;
 polymerizing the ethylene or propene.

The process of copolymerizing ethylene and at least one α-olefin (including propene and polar α-olefins) and/or a 1,3-diene comprises the following steps:
 activating the iron precatalyst by dissolving in a reactor in the presence of at least one hydrocarbon solvent, at least one alkylating agent, and optionally hydrogen;
 adding ethylene and at least one α-olefin (and/or 1,3-diene) into the reactor;
 copolymerizing the ethylene and the α-olefin (and/or 1,3-diene).

The propene copolymerization process is performed following the same steps. This particularly also relates to the synthesis of ethylene-propene-diene (EPDM) terpolymers.

Thus, according to a particular embodiment, at least one α-olefin is also added to the reactor. Ethylene or propene is thus copolymerized in the presence of this α-olefin; the α-olefin being other than propene in the copolymerization of propene.

The precatalyst is advantageously activated by preparing a dispersion containing:
 the precatalyst;
 at least one hydrocarbon solvent such as an alkane, for example, heptane;
 at least one alkylating agent.

The hydrocarbon solvent used to activate the precatalyst is advantageously an alkane. It can be heptane or methylcyclohexane. Mixtures of alkanes used conventionally in the industry are also adapted.

The alkylating agent used to activate the precatalyst is advantageously selected from the group comprising:
 aluminum alkylating agents with the formula $[AlR_{3-p}Cl_p]_n$ with p=0-1 or 2, n a non-zero integer, and R a hydrogen atom or an alkyl, for example, $AlMe_3$; $AlEt_3$; $Al(iBu)_3$; $AlEt_2Cl$; $Al(iBu)_2H$ (DIBALH, diisobutylaluminium hydride);
 methylaluminoxane (MAO);
 $ZnEt_2$;
 $MgBu_2$; and
 MgBuOct (BOMAG; butyloctylmagnesium).

The alkylating agent is preferably diisobuytlaluminum hydride or triethylaluminum.

In addition, activation can also include adding hydrogen to the reaction medium under pressure.

Once the precatalyst is activated, the monomer(s) to be polymerized is (are) placed into the reactor.

For example, the reactor can be placed under 5-10 bars of pressure of ethylene or propene, optionally in the presence of 0.1 to 3 bars of hydrogen. 5-10 bars of pressure of α-olefin (other than propene when propene is copolymerized) may also be added.

The polymerization reaction temperature is advantageously less than 100° C. and more advantageously between 50 and 90° C.

Polymerization reaction time is advantageously less than 24 hours and more advantageously comprised between 0.1 and 3 hours.

Polymerization usually takes place in the hydrocarbon solvent used to activate the precatalyst.

Polymerization is generally done in an autoclave reactor.

When the ethylene or propene is copolymerized in the presence of at least one α-olefin, the α-olefin is preferably of formula $CH_2=CHR^1$; where $R^1$ is selected from the group comprising: hydrocarbon groups without unsaturation, for example $CH_3$ (propene) or $(CH_2)_3CH_3$ (1-hexene); hydrocarbon groups comprising at least one conjugated or unconjugated unsaturation with terminal unsaturation in the α position, for example a 1,3-diene like butadiene has such a group; and aromatic hydrocarbon groups, styrene for example, has such as group.

The α-olefin having the formula $CH_2=CHR^1$ can be selected from within the group comprising dienes, particularly conjugated dienes, in particular butadiene or isoprene; styrene; α-olefins where $R^1=C_nH_{2n-1}$, n being an integer between 1 and 100, advantageously between 1 and 10; and their mixtures.

According to a particular embodiment, the copolymerization process consists of copolymerizing:
- 0.01 to 99.99 mol % ethylene or propene, advantageously 90 to 99.9 mol %; and
- 0.01 to 99.99 mol % α-olefin (polar or non-polar), advantageously 0.1 to 10 mol %.

Of course, when copolymerizing propene, the α-olefin used is different from the propene.

The amount of precatalyst used is advantageously between 0.1 and 10,000 ppm by weight compared to the total weight of the monomers (ethylene+α-olefin or propene+α-olefin), more advantageously between 10 and 1,000 ppm by weight.

The polymers obtained by the processes using the precatalyst according to the invention can be isolated from the reaction medium using the following steps:
- optional precipitation in particular assisted by a non-solvent;
- filtration;
- drying in particular by evaporating the solvent and optionally the non-solvent.

The non-solvent used to precipitate the polymers is a solvent in which the polymers are not soluble. It can in particular be an alcohol-methanol, ethanol, or isopropanol, for example.

The polymers resulting from these polymerizations have intrinsic chemical and mechanical properties suitable for use in the precatalyst according to the invention.

For example, a quantity of polymer (polyethylene, for example) of the order of 1000 grams per gram of precatalyst per hour, at a polymerization temperature of less than 100° C. in the presence of at least 10 bars of α-olefins can be obtained Using the precatalyst according to the invention in a polymerization process presents numerous advantages, among which are:
- the possibility of producing high molar mass linear polyolefins, 10,000 to $10^7$ g/mol;
- the precatalyst and iron salts used to prepare the precatalyst are solids and are less subject to deactivation (degradation) during storage than the conventional Ziegler-Natta systems. In addition, the titanium chloride used to prepare the conventional Ziegler Natta is a corrosive liquid, which complicates its storage and use, particularly on an industrial scale;
- the possibility of substituting the industry's conventional Ziegler-Natta systems, given that the catalyst according to the invention can be used under the same conditions.

The invention and the benefits that flow from it will be clearer upon reading the following examples, given to illustrate the invention and not to limit it in any way.

EXAMPLES OF EMBODIMENTS OF THE INVENTION

Three precatalysts P1-P3 according to the invention (examples 1-3, table 1) were prepared and used to polymerize or copolymerize ethylene (examples 4-8, table 2)

Example 1: Preparing Precatalyst P1 with Formula $Fe_{0.32}MgCl_{2.7}THF_{1.1}(SiCl_4)_{0.10}$ In a 100 mL Schlenck tube, 1 g of support $MgCl_2(THF)_{1.5}$ is added in an inert argon atmosphere. Still under an inert argon atmosphere, 0.3 g $FeCl_2$, then 20 mL of 1M $SiCl_4$ solution are added to dichloromethane. The suspension is then stirred magnetically at room temperature for 72 hours.

After 72 hours, the precatalyst obtained is washed 3 times by adding heptane and removing the supernatant. The precatalyst is then dried under vacuum at 50° C. for one hour.

Example 2: Preparing Precatalyst P2, Formula $Fe_{0.42}MgCl_{2.7}THF_{1.2}$

In a 100 mL Schlenck tube, 1.2 g of $MgCl_2(THF)_{1.5}$ support is added in an inert argon atmosphere. Still under inert argon atmosphere, introduce 0.3 g of $FeCl_2$, then 20 mL of dichloromethane. The suspension is then stirred magnetically at room temperature for one week. After one week, the precatalyst obtained is washed 3 times by adding heptane and removing the supernatant. The precatalyst is then dried under vacuum at room temperature for one hour.

Example 3: Preparing Precatalyst P3 with Formula $Fe_{0.49}MgCl_{2.0}THF_{0.26}(BCl_3)_{0.34}$ In a 100 mL Schlenck tube, 1.1 g of $MgCl_2(THF)_{1.5}$ support is added in an inert argon atmosphere. Still under inert argon atmosphere, 0.3 g of $FeCl_2$, then 10 mL of $BCl_3$ 1M solution in heptane, and 20 mL of dichloromethane are added. The suspension is then stirred magnetically at room temperature for one week.

After one week, the precatalyst obtained is washed 3 times by adding heptane and removing the supernatant. The precatalyst is then dried under vacuum at room temperature for one hour.

In the following examples 4-18, the polymer may be precipitated with methanol, even though it may already be in the form of beads.

Example 4: Polymerization of Ethylene from Precatalyst P1

In a flask containing 300 mL of dry heptane, add 3 mL of triethylaluminum solution at 1M in heptane, then 36 mg of precatalyst P1.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After one hour of reaction, the reactor is cooled to room temperature and degassed.

The polymer obtained is then filtered and washed with methanol.

Precatalyst P1 thus produced 2.3 g of polyethylene.

Example 5: Polymerization of Ethylene from Precatalyst P3

In a flask containing 300 mL of dry heptane, 0.5 mL of 1M triethylaluminum solution in heptane, then 32 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After one hour of reaction, the reactor is cooled to room temperature and degassed.

The polymer obtained is then filtered and washed with methanol.

Precatalyst P3 thus produced 4.9 g of polyethylene. $M_n$=112,000 g/mol; $M_w/M_n$=2.7 (SEC, PE calibration, eluent: TCB 150° C.).

Example 6: Copolymerization of Ethylene/Hexane from Precatalyst P3

In a flask containing 300 mL of dry heptane, 0.5 mL of 1M triethylaluminum solution in heptane, 10 mL of 1-hexene ($C_6H_{12}$), then 24 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After one hour of reaction, the reactor is cooled to room temperature and degassed.

The polymer obtained is then filtered and washed with methanol.

Precatalyst P3 thus produced 2 g of copolymer.

Example 7: Copolymerization of Ethylene/Butadiene from Precatalyst P3

In a flask containing 300 mL of dry heptane, 0.5 mL of 1M triethylaluminum solution in heptane, 10 mL of butadiene ($C_4H_6$), then 43 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After 30 minutes of reaction, the reactor is cooled to room temperature and degassed.

The polymer obtained is then filtered and washed with methanol.

Precatalyst P3 thus produced 0.6 g of copolymer.

Example 8: Polymerization of Ethylene from Precatalyst P2

In a flask containing 300 mL of dry heptane, 0.5 mL of 1M triethylaluminum solution in heptane, then 35 mg of precatalyst P2 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After one hour of reaction, the reactor is cooled to room temperature and degassed.

The polymer obtained is then filtered and washed with methanol.

Precatalyst P2 thus produced 0.1 g of polyethylene.

Example 9: Polymerization of Ethylene from Precatalyst P3

In a flask containing 300 mL of dry heptane, 1 mL of 1M diisobuytlaluminum hydride solution in heptane, then 95 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After one hour of reaction, the reactor is cooled to room temperature and degassed.

The polymer obtained is then filtered and washed with methanol.

Precatalyst P3 thus produced 40 g of polyethylene. Melting point of PE: 139° C.

Example 10: Polymerization of Ethylene from Precatalyst P3

In a flask containing 300 mL of dry heptane, 1 mL of 1M diisobuytlaluminum hydride solution in heptane, then 93 mg of precatalyst P3 are added.

The solution is transferred under argon atmosphere into a 1 L stainless-steel reactor. The reactor is then pressurized at 1 bar ethylene, then pressurized progressively up to 8 bars (of ethylene) and heated to 80° C. A reservoir is used to maintain a constant pressure. After one hour of reaction, the reactor is cooled to room temperature and degassed.

The polymer obtained is then filtered and washed with methanol.

Precatalyst P3 thus produced 45 g of polyethylene. Melting point of PE: 139.5° C.

Example 11: Copolymerization of Ethylene/1-Hexene from Precatalyst P3

In a flask containing 300 mL of dry heptane, 1 mL of 1M diisobuytlaluminum hydride solution in heptane, 10 mL of 1-hexene ($C_6H_{12}$), then 101 mg of precatalyst P3 are added.

The solution is transferred under argon atmosphere into a 1 L stainless-steel reactor. The reactor is then pressurized at 1 bar ethylene, then pressurized progressively up to 8 bars (of ethylene) and heated to 80° C. A reservoir is used to maintain a constant pressure. After 1 hour of reaction, the reactor is cooled to room temperature and degassed.

The polymer obtained is then filtered and washed with methanol.

Precatalyst P3 thus produced 37 g of copolymer. Melting point of copolymer: 136.5° C.

Incorporation of 1-hexene ~0.6% ($^1$H and $^{13}$C NMR characterization)

Example 12: Copolymerization of Ethylene/Styrene from Precatalyst P3

In a flask containing 300 mL of dry heptane, 1 mL of 1M diisobuytlaluminum hydride solution in heptane, 10 mL of styrene ($C_8H_8$), then 97 mg of precatalyst P3 are added.

The solution is transferred under argon atmosphere into a 1 L stainless-steel reactor. The reactor is then pressurized at 1 bar ethylene, then pressurized progressively up to 8 bars (of ethylene) and heated to 80° C. A reservoir is used to maintain a constant pressure. After 1 hour of reaction, the reactor is cooled to room temperature and degassed.

The polymer obtained is then filtered and washed with methanol.

Precatalyst P3 thus produced 23 g of copolymer. Melting point of copolymer: 134° C.

Incorporation of styrene ~0.5% ($^1$H and $^{13}$C NMR characterization)

Example 13 (Counter Example): Copolymerization of Ethylene/Ethyl Acrylate from Precatalyst PTi (Conventional Ziegler-Natta Titanium-Based Catalyst Prepared from $MgCl_2$/THF Support and $TiCl_4$ According to Prior Art, see ACS Catalysis, 2013, 3, 52)

In a flask containing 300 ml, of dry heptane, 0.5 mL of 1M triethylaluminum solution in heptane, 5 mL of ethyl acrylate (dried with 0.5 mL of 1M triethylaluminum), then 23 mg of precatalyst PTi are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After 1 hour of reaction, the reactor is cooled to room temperature and degassed.

Precatalyst PTi did not produce copolymer.

Example 14: Copolymerization of Ethylene/Ethyl Acrylate from Precatalyst P3

In a flask containing 300 mL of dry heptane, 0.5 mL of 1M triethylaluminum solution in heptane, 5 mL of ethyl acrylate (dried with 0.5 mL of 1M triethylaluminum), then 103 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After 1 hour of reaction, the reactor is cooled to room temperature and degassed.

The polymer obtained is then precipitated from methanol, filtered and washed with methanol.

Precatalyst P3 thus produced 1.3 g of copolymer. Melting point of copolymer: 115° C.

Example 15: Copolymerization of Ethylene/Butyl Acrylate from Precatalyst P3

In a flask containing 300 mL of dry heptane, 0.5 mL of 1M triethylaluminum solution in heptane, 5 mL of butyl acrylate (dried with 0.5 mL of 1M triethylaluminum), then 97 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After 1 hour of reaction, the reactor is cooled to room temperature and degassed.

The polymer obtained is then precipitated from methanol, filtered and washed with methanol.

Precatalyst P3 thus produced 1.5 g of copolymer. Melting point of PE: 110° C.

Example 16: Copolymerization of Ethylene/Vinyl Acetate from Precatalyst P3

In a flask containing 300 mL of dry heptane, 0.5 mL of 1M triethylaluminum solution in heptane, 5 mL of vinyl acetate (dried with 0.5 mL of 1M triethylaluminum), then 98 mg of precatalyst P3 are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After 1 hour of reaction, the reactor is cooled to room temperature and degassed.

The polymer obtained is then precipitated from methanol, filtered and washed with methanol.

Precatalyst P3 thus produced 2 g of copolymer. Melting point of copolymer: 122° C.

Incorporation of vinyl acetate ~1% ($^1$H and $^{13}$C NMR characterization, FTIR characterization)

Example 17: Copolymerization of Ethylene/Vinyl Acetate from Precatalyst P3

In a flask containing 300 mL of dry heptane, 0.5 mL of 1M diisobutylaluminum hydride solution in heptane, 5 mL of vinyl acetate (dried with 0.5 mL of 1M triisobutylaluminum), then 100 mg of precatalyst P3 are added.

The solution is transferred under argon atmosphere into a 1 L stainless-steel reactor. The reactor is then pressurized at 1 bar ethylene, then pressurized progressively up to 8 bars (of ethylene) and heated to 80° C. A reservoir is used to maintain a constant pressure. After 1 hour of reaction, the reactor is cooled to room temperature and degassed.

The polymer obtained is then precipitated from methanol, filtered and washed with methanol.

Precatalyst P3 thus produced 3.5 g of copolymer. Melting point of copolymer: 125° C.

Incorporation of vinyl acetate ~1% ($^1$H and $^{13}$C NMR characterization, FTIR characterization)

Example 18 (Counter Example): Copolymerization of Ethylene/Vinyl Acetate from Precatalyst PTi (Conventional Ziegler-Natta Titanium-Based Catalyst Prepared from $MgCl_2$/THF Support and $TiCl_4$ According to Prior Art, see ACS Catalysis, 2013, 3, 52)

In a flask containing 300 mL of dry heptane, 0.5 mL of 1M triethylaluminum solution in heptane, 5 mL of vinyl acetate (dried with 0.5 mL of 1M triethylaluminum), then 25 mg of precatalyst PTi are added.

The solution is transferred under argon atmosphere into a 1 L stainless-steel reactor. The reactor is then pressurized at 1 bar hydrogen, then pressurized progressively up to 8 bars (of ethylene) and heated to 80° C. A reservoir is used to maintain a constant pressure. After 1 hour of reaction, the reactor is cooled to room temperature and degassed.

Precatalyst PTi did not produce copolymer.

TABLE 1

Synthesis of Precatalysts P1-P3 According to the Invention

| Examples | 1 | 2 | 3 |
|---|---|---|---|
| Precatalyst | P1 | P2 | P3 |
| Iron salt (wt %) | 5 | 36 | 32 |

TABLE 1-continued

Synthesis of Precatalysts P1-P3 According to the Invention

| Examples | 1 | 2 | 3 |
|---|---|---|---|
| Inorganic Support (wt %) | 91 | 64 | 48 |
| Lewis Acid (wt %) | 4 | 0 | 20 |
| Solvent | 1M SiCl$_4$ in heptane | CH$_2$Cl$_2$ | 1M BCl$_3$ in heptane and CH$_2$Cl$_2$ | wt % = percent by weight

TABLE 2

Examples 4-18 of Polymerization According to the Invention

| Examples | 4 | 5 | 6 | 7 | 8 |
|---|---|---|---|---|---|
| Monomers | C$_2$H$_4$ | C$_2$H$_4$ | C$_2$H$_4$/C$_6$H$_{12}$ | C$_2$H$_4$/C$_4$H$_6$ | C$_2$H$_4$ |
| Alkylating agent | triethyl aluminum | triethyl aluminum | triethyl aluminum | triethyl aluminum | triethyl aluminum |
| Total Pressure | 8 bars | 8 bars | 8 bars | 8 bars | 8 bars |
| Precatalyst | P1 | P3 | P3 | P3 | P2 |
| Solvent | heptane | heptane | heptane | heptane | heptane |
| Polymerization Temperature | 80° C. | 80° C. | 80° C. | 80° C. | 80° C. |
| Polymerization duration | 1 hour | 1 hour | 1 hour | 30 minutes | 1 hour |

| | Examples | | | | |
|---|---|---|---|---|---|
| | 9 | 10 | 11 | 12 | 13 (counter exemple) |
| Monomers | C$_2$H$_4$ | C$_2$H$_4$ | C$_2$H$_4$/C$_6$H$_{12}$ (1-hexene) | C$_2$H$_4$/C$_8$H$_8$ (Styrene) | C$_2$H$_4$ EthAcr |
| Alkylating agent | diisobuytl aluminum hydride | diisobuytl aluminum hydride | diisobuytl aluminum hydride | diisobuytl aluminum hydride | triethyl aluminum |
| Total Pressure | 8 bars | 8 bars | 8 bars | 8 bars | 8 bars |
| Precatalyst | P3 | P3 | P3 | P3 | PTi |
| Solvent | heptane | heptane | heptane | heptane | heptane |
| Polymerization Temperature | 80° C. | 80° C. | 80° C. | 80° C. | 80° C. |
| Polymerization duration | 1 hour | 1 hour | 1 hour | 1 hour | 1 hour |

| | Examples | | | | |
|---|---|---|---|---|---|
| | 14 | 15 | 16 | 17 | 18 (counter exemple) |
| Monomers | C$_2$H$_4$/EthAcr | C$_2$H$_4$/ButAcr | C$_2$H$_4$/VinAc | C$_2$H$_4$/VinAc | C$_2$H$_4$/VinAc |
| Alkylating agent | triethyl-aluminum | triethyl-aluminum | triethyl-aluminum | diisobutyl-aluminum hydride | triethyl-aluminum |
| Total Pressure | 8 bars | 8 bars | 8 bars | 8 bars | 8 bars |
| Precatalyst | P3 | P3 | P3 | P3 | PTi |
| Solvent | heptane | Heptane | heptane | heptane | heptane |
| Polymerization Temperature | 80° C. | 80° C. | 80° C. | 80° C. | 80° C. |
| Polymerization duration | 1 hour | 1 hour | 1 hour | 1 hour | 1 hour |

EthAcr: ethyl acrylate
ButAcr: butyl acrylate
VinAc: vinyl acetate

The invention claimed is:

1. A precatalyst for the polymerization of α-olefins, having the formula Fe$_u$M$^{alc}_v$X$_w$(LA)$_y$(LB)$_z$ wherein:
   M$^{alc}$ is an alkali metal and/or an alkaline-earth metal;
   X is an anion;
   LA is a Lewis acid;
   LB is a Lewis base;
   u is from 0.001 to 10;
   v is an integer ≥1;
   w is from 1 to 20;
   y is from 0 to 10; and
   z is from 0 to 10.

2. The precatalyst according to claim 1, wherein:
   u is from 0.01 to 0.5;
   w is from 1.01 to 3;
   y is from 0.1 to 1; and
   z is from 0.05 to 0.5.

3. The precatalyst according to claim 1, which is in powder form.

4. A process for preparing a precatalyst, which comprises the following steps:
   a suspension is prepared containing:
   at least one organic solvent;
   at least one iron salt;
   at least one inorganic support;

this suspension is mixed at a temperature comprised between 10 and 200° C.;
the solvent is removed; and
a precatalyst with formula $Fe_uM^{alc}_vX_w(LA)_y(LB)_z$ is obtained.

5. The process according to claim 4, wherein the iron salt is selected from the group consisting of: $FeCl_2$; $FeBr_2$; $FeI_2$; $FeO$; $Fe(SO_4)$; and combinations thereof.

6. The process according to claim 4, wherein the inorganic support has the formula $M^{alc}X_n$ or $M^{alc}O_{n/2}$;
$M^{alc}$ being an alkali metal or an alkaline-earth metal;
n=1 or 2; and
X being a halogen; a sulfate; or a phosphate.

7. A process for polymerization of ethylene or propene, comprising the following steps:
activation of the precatalyst according to claim 1 by combining said precatalyst, at least one hydrocarbon solvent, at least one alkylating agent, and optionally, hydrogen in a reactor;
adding ethylene or propene into the reactor; and
polymerizing the ethylene or propene.

8. The process according to claim 7, wherein at least one α-olefin is also added into the reactor, and as a result the ethylene or propene is copolymerized in the presence of said α-olefin; the α-olefin being other than propene in the case of propene copolymerization.

9. The process according to claim 8, wherein the α-olefin is formula $CH_2=CHR^1$, where $R^1$ is selected from the group consisting of: saturated hydrocarbon groups; hydrocarbon groups comprising at least one unsaturation which is conjugated or unconjugated with the terminal unsaturation in the α-position; and aromatic hydrocarbon groups.

10. The process according to claim 8, wherein the α-olefin is a polar α-olefin.

11. The process according to claim 8, wherein the α-olefin is a polar α-olefin selected from the group consisting of:
monomers of formula $CH_2=CR^2R^3$
wherein $R^2$=H or $CH_3$ and $R^3$ is any of the following:
C(=O)—O-alkyl;
O—(C=O)-alkyl;
CN;
C(=O)—N-(alkyl)$_2$;
O-alkyl; and
halide;
wherein the alkyl group is a linear or branched $C_nH_{2n-1}$ group in which n is an integer ranging from 1 to 100, and
monomers of formula $CH_2=CR^2R^3$ with $R^2=R^3$=halide.

12. The process according to claim 8, which comprises copolymerizing 0.01 to 99.99 mol % of ethylene or propene and 0.01 to 99.99 mol % of α-olefin.

13. The process according to claim 8, which comprises copolymerizing 90 to 99.9 mol % of ethylene or propene and 0.1 to 10 mol % of α-olefin.

14. The process according to claim 7, wherein the alkylating agent is selected from a group consisting of aluminum alkylating agents with formula $[AlR_{3-p}Cl_p]_n$ with p=0, 1, or 2, n is a non-zero integer, and R is a hydrogen atom or an alkyl group.

15. The process according to claim 14, wherein the alkylating agent is selected from the group consisting of: $AlMe_3$, $AlEt_3$, $Al(iBu)_3$, $AlEt_2Cl$, $Al(iBu)_2H$), methylaluminoxane (MAO), $ZnEt_2$, $MgBu_2$ and MgBuOct.

* * * * *